United States Patent Office 3,255,167
Patented June 7, 1966

3,255,167
OLEFIN POLYMERIZATION IN PRESENCE OF A REDUCED TITANIUM HALIDE SUPPORTED ON GAMMA ALUMINA AND AN ORGANOMETALLIC COMPOUND
Charles L. Thomas, Swarthmore, Pa., assignor to Sun Oil Company, Philadelphia, Pa., a corporation of New Jersey
No Drawing. Original application Sept. 26, 1956, Ser. No. 612,103, now Patent No. 3,153,634. Divided and this application Aug. 24, 1964, Ser. No. 391,736
5 Claims. (Cl. 260—88.2)

This invention relates to new catalytic compositions especially effective for the polymerization of olefins and to processes for polymerizing olefins using such novel catalytic compositions.

This application is a division of application Serial No. 612,103, filed September 26, 1956, now U.S. Patent No. 3,153,634, granted October 20, 1964.

Olefins have heretofore been polymerized in processes using a wide variety of catalytic materials. However, heretofore described processes for the polymerization of olefins, and especially the normally gaseous olefins, to solid polymers have not been entirely satisfactory. Such processes usually involve very high pressures so that expensive equipment and difficult operating techniques are required. Low pressure processes have also been described including, for example, the use of organometallic compounds with metal halides. However, such catalytic combinations are unsatisfactory because of the large amount of catalyst required to produce an appreciable amount of polymer.

An object of the present invention is to provide new catalytic compositions especially suitable for polymerizing olefins. Another object is to provide new catalytic compositions effective for polymerizing olefins under relatively low pressure and temperature conditions. A further object is to provide a process for the polymerization of olefins using the novel catalyst of the invention. A specific object of the invention is to provide a process for the polymerization of normally gaseous olefins to solid polymers which employs low temperature and pressure conditions, and which yields a large amount of polymer as compared to the amount of catalyst employed.

It has now been found that by impregnating gamma alumina with a titanium or zirconium compound which has the metal in the tetravalent state, and subjecting the impregnated composition to reducing conditions so that the tetravalent metal of the impregnating compound is converted to a lower valence state, a novel composition is prepared which is remarkably effective for polymerizing olefins.

In accordance with an embodiment of the invention, gamma alumina is impregnated with titanium terachloride and the impregnated composition subjected to reducing conditions to convert the titanium to a lower valence state, i.e., to titanium dichloride, titanium trichloride, or to mixtures of the subhalides. By "subhalide," and terms of similar import, is meant the dihalide, trihalide, or mixtures of the dihalide and trihalide of the indicated metal. The resulting composition consists essentially of gamma alumina and a subchloride of titanium. A normally gaseous olefin is then contacted, under polymerizing conditions involving relatively low temperatures and pressures, with the resulting catalytic composition. By such contacting the olefin is rapidly converted to solid polymers and a large amount of polymer is obtained with relatively small amounts of the catalytic composition.

Olefins which can be employed in the process of the invention have a terminal olefinic bond, i.e., a terminal carbon atom of the olefin is attached to the adjacent carbon atom by a double bond. Olefins which have from 2 to 8 carbon atoms give especially good results. For example, ethylene, propylene, isobutylene, butene-1, 1,3-butadiene, and the pentenes, hexenes, heptenes and octenes which have a terminal olefinic bond, and mixtures thereof, give good results in the process of the invention. The process is especially suitable for normally gaseous olefins, i.e., ethylene, propylene, and mixtures of ethylene and propylene, and hence normally gaseous olefins constitute preferred feed stocks for use in the process of the invention. The olefins can be obtained from any source, such as from the thermal or catalytic cracking of higher boiling hydrocarbons, the dehydrogenation of hydrocarbons, the dehydration of alcohol, or the like. Saturated hydrocarbons can be present and act as diluents.

Gamma alumina is an essential constituent of the catalytic composition of the invention. This form of alumina is well known and can be prepared, for example, by heating aluminum-containing materials, such as the trihydrate of alumina or the alpha monohydrate of alumina, to from about 500° C. to 900° C. Other materials such as silica or magnesia can be present with the gamma alumina to an extent of about 40% by weight and good results obtained.

The tetravalent titanium and zirconium compounds to employ are the tetrahalides. Titanium tetrachloride and zirconium tetrachloride are preferred materials, but the bromides or fluorides can be employed with good results. For convenience, catalyst preparation and the polymerization process of the invention are described using titanium tetrachloride as illustrative of the tetravalent titanium and zirconium compounds which can be employed.

The catalyst of the invention is prepared by impregnating gamma alumina with titanium tetrtachloride and subjecting the impregnated composition to reducing conditions. Titanium tetrachloride can be vaporized and the vapors thereof passed through a bed of the alumina. If desired, an inert gas such as nitrogen can be combined with the vapors, such as by bubbling nitrogen through liquid titanium tetrachloride maintained at about its boiling point, to assist in the operation. Impregnation can also be accomplished directly by admixing liquid titanium tetrachloride, or more preferably a solution of titanium tetrachloride, in a solvent such as benzene, with the alumina. After impregnation, the impregnated composition is subjected to reducing conditions. This can be accomplished by passing a reducing gas, preferably hydrogen, through the impregnated alumina under elevated temperature conditions such as from 250° C. to 500° C. It is advantageous to increase the temperature, within the indicated ranges, as the reduction proceeds. Reduction can also be accomplished by contacting the impregnated alumina with a solution of dispersion of a reducing agent. Thus, a solution or dispersion of an alkali or an alkaline earth metal, e.g., sodium, potassium, lithium, calcium or magnesium, or amalgams thereof with mercury; metal hydrides, such as lithium hydride, sodium hydride or the like; complexes of the mentioned hydrides with aluminum hydride such as lithium aluminum hydride; organometallic compounds of the metals of Groups I, II and III of the Periodic Table such as n-butyl-lithium, diethyl zinc, triethyl aluminum, tri-n-propyl aluminum, tri-isobutyl aluminum, or the like, give good results. The use of hydrogen as a reducing material is especially valuable when the alumina has been impregnated with vapors of the titanium tetrachloride. However, hydrogen can also be used when the alumina is impregnated with a solution of titanium tetrachloride in which case it is preferred to drain excess solution, if any, from the impregnated composition and to remove excess solvent therefrom by evaporation prior to contacting with hydrogen. The use of a solution or a dispersion of a reducing agent is especially valuable when the alumina has been impregnated with a solution of titanium tetrachloride, in which case excess solution, if any, should be drained from the composition prior to reduction, but removal of solvent from the impregnated composition is unnecessary. However, a reducing solution or dispersion can also conveniently be used when the alumina has been impregnated with vapors of titanium tetrachloride. A solution of a reduction agent gives especially good results, apparently because the impregnated composition is more readily penetrated thereby, and hence the use of a solution of a reducing agent constitutes a preferred embodiment of the invention.

An especially preferred catalytic composition of the invention is prepared by contacting gamma alumina impregnated with titanium tetrachloride with a solution of an organometallic compound, as above described, to reduce the titanium tetrachloride to a subhalide. When so reduced, it appears that the organometallic reducing agent, or some portion thereof, forms a complex with the titanium subhalide, and the resulting composition is especially effective for polymerizing olefins.

The catalytic compositions of the invention consist essentially of gamma alumina impregnated with titanium or zirconium subhalides. The quantity of subhalide should be from 0.2% to 20% by weight of the final composition, and is preferably within the range of from 1% to 10% by weight. For convenience, the quantities of subhalides as herein expressed are calculated as the tetrahalide, i.e., as the quantity of tetrahalide used to impregnate the gamma alumina. The quantity of tetrahalide used to impregnate the gamma alumina should be regulated so that the final composition contains the designated quantity of subhalide.

The polymerization process of the invention may be operated as a continuous, semi-continuous, or batch-type operation. In batch operation, the catalytic composition is dispersed in a relatively large volume of an inert reaction medium to form a slurry. While the quantity of reaction medium to employ is not critical, from about 5 to 1,000 parts, per part of catalytic composition, gives good results. The olefin is then introduced, such as by bubbling into the slurry, under polymerizing conditions. The temperature should be maintained within the range of from 0° C. to 200° C., and preferably is maintained within the range of from 50° C. to 100° C. Subatmospheric pressure can be used, but it is preferred to employ a pressure of from atmospheric to about 500 p.s.i.g. (pounds per square inch gauge. It is convenient to periodically or continuously introduce the olefin being polymerized into the slurry to maintain the desired pressure. Time does not appear to be a critical variable and sufficient time should be allowed to prepare the desired polymer in good yield, which time can usually vary from about 15 minutes to 8 hours, depending largely upon the rate of addition of the olefin to the slurry and the reaction conditions employed.

In continuous operation, an olefin dissolved in an inert, liquid reaction medium is passed through a bed of the catalytic composition under the temperature and pressure conditions as described for slurry operation. The space rate can be varied from about 0.1 to 10 v.v./hr. (volume of feed per volume of catalyst per hour) and good results obtained. If desired, vapor phase operation can be employed but is not preferred, since a coating of polymer on the catalyst rapidly forms so that further polymerization is difficult. Suitable diluents which can be used as the inert reaction medium in the process of the invention are liquid under the conditions employed and include the saturated hydrocarbons, such as the pentanes, hexanes, heptanes, octanes, nonanes, decanes, cyclopentanes, alkyl substituted cyclopentanes, cyclohexanes, alkyl substituted cyclohexanes, decalin, mixtures thereof, and the like. Aromatic hydrocarbons such as benzene, toluene, xylene, and the like, can also be used with good results, as can ethers such as diethyl ether, and the like.

The solid polymer products can be dissolved, suspended or both dissolved and suspended in the reaction and may be recovered by any convenient means. Preferably the reaction mixture is separated from the catalyst and cooled, say to from −10° C. to 20° C., to precipitate dissolved polymers, which are then separated such as by filtering. In some instances, it is advantageous to wash the reaction mixture with alcohol and then with an inert diluent, especially where the catalyst was prepared by reduction using an organometallic compound. Continuous extraction of the reaction mixture with hot toluene, xylene, decalin, or the like, is advantageous to separate polymer from catalyst in many instances. Other means of polymer recovery can be used if desired.

The solid polymer products of the invention can vary from soft, wax-like polymers having molecular weights of from about 300 to 800 to hard, resinous materials having molecular weights of above about 100,000. These polymers have a wide variety of uses, such as in preparing thin sheets for wrapping food products, in preparing pipes for transporting fluids, in preparing containers for liquids, and the like. Such articles can be made by extrusion, molding, or other fabrication processes.

The following example demonstrates the superior results obtained with the catalysts of the invention, which contain gamma alumina, and illustrates an embodiment of the invention. In the example, "parts" refers to parts by weight.

A polymerization reaction was performed without using gamma alumina as a catalyst component, as follows:

Into a reactor containing about 700 parts of n-hexane were introduced, with stirring, 4.8 parts of triisobutyl aluminum and 4.5 parts of titanium tetrachloride, the mole ratio of triisobutyl aluminum to titanium tetrachloride being 1. A finely divided blackish precipitate formed in the reaction medium. Oxygen and moisture had been substantially removed from the reactor and materials introduced therein. Ethylene was then introduced into the reactor to a pressure of 75 p.s.i.g. The temperature of the reactor was maintained within the range of from 60° C. to 80° C. for about 125 minutes, during which time the reaction mixture components were continuously stirred. Additional ethylene was added, as needed, to maintain the pressure at 75 p.s.i.g.

The reaction was stopped and methanol added to the reaction mixture. The reaction mixture was filtered and the precipitate heated with 10 volume percent hydrochloric acid in isopropanol. The polymers were again filtered, washed with methanol and then with n-pentane. The pentane was then evaporated.

There were recovered 136 parts of a white, finely divided polymer product having a melting point of 124° C., a specific gravity of 0.957, and a molecular weight of 71,000. The weight of polymer product produced per unit weight of catalyst (triisobutyl aluminum+titanium tetrachloride) was 14.6.

To illustrate the advantages of the catalyst and process of the invention, 40 parts of gamma alumina are impregnated with 0.48 part of titanium tetrachloride by contacting the alumina with a quantity of n-hexane, containing the indicated amount of titanium tetrachloride, so that all of the solution is adsorbed by the alumina. A slurry of the impregnated alumina is prepared by admixing with 700 parts of n-hexane, and 0.45 part of triisobutyl aluminum is added to the slurry with agitation. The alumina assumes a blackish color. The resulting catalyst composition, used under equivalent polymerization conditions as above described, results in a yield of about 180 parts of polymer product having properties substantially similar to those above described. The weight of polymer produced per unit weight of catalyst (triisobutyl aluminum+titanium tetrachloride) is 194. Thus, through the use of gamma alumina, a tenfold decrease in the amounts of triisobutyl aluminum and titanium tetrachloride results in a substantial increase in polymer product.

To illustrate another embodiment of the invention, titanium tetrachloride vapors admixed with nitrogen are passed over gamma alumina until the alumina is impregnated with 2% by weight of titanium tetrachloride. Hydrogen is then contacted with the impregnated alumina at a temperature of about 300° C. to reduce the tetrachloride to a mixture of titanium dichloride and trichloride. The resulting composition can be used, per se, for polymerizing olefins, or a small quantity of an additional material which serves as a promoter, such as a trialkyl aluminum, can be added. When used in this way, it is preferred to use only a small amount of the promoter, say a mole ratio of titanium subchlorides (calculated as the tetrachloride) to the promoter of from about 1:0.01 to 1:0.5.

The catalysts of the invention are also useful in processes other than polymerization, such as in the reforming and isomerization of hydrocarbons to form other hydrocarbons.

The invention claimed is:

1. A process for polymerizing olefins to high molecular weight polymers which comprises mixing (A) gamma alumina with a halide selected from the group consisting of titanium tetrahalides and zirconium tetrahalides, (B) contacting said mixture with an organometallic compound selected from the group consisting of an alkali metal hydride, an alkali metal aluminum hydride and an aluminum hydrocarbon thereby to provide said gamma alumina with 0.2 to 20% by weight of a halide adsorbed thereon selected from the group consisting of titanium subchlorides, titanium subbromides, titanium subfluorides, zirconium subchlorides, zirconium subbromides, and zirconium subfluorides, and (C) thereafter contacting an olefin with the catalytic material so-prepared.

2. The process of claim 1 wherein said second named halide is titanium trichloride.

3. The process of claim 2 wherein said olefin is ethylene.

4. The process of claim 2 wherein said olefin is propylene.

5. The process of claim 2 wherein said olefin is a mixture of ethylene and propylene.

References Cited by the Examiner

UNITED STATES PATENTS

| | | | |
|---|---|---|---|
| 2,726,231 | 12/1955 | Field et al. | 260—94.9 |
| 2,843,577 | 7/1958 | Friedlander et al. | 260—94.9 |
| 2,909,512 | 10/1959 | Bruce | 260—94.9 |

JOSEPH L. SCHOFER, *Primary Examiner.*